(12) United States Patent
Gounares

(10) Patent No.: US 8,995,070 B2
(45) Date of Patent: Mar. 31, 2015

(54) GARBAGE COLLECTION BASED ON FUNCTIONAL BLOCK SIZE

(71) Applicant: Concurix Corporation, Kirkland, WA (US)

(72) Inventor: Alexander G. Gounares, Kirkland, WA (US)

(73) Assignee: Concurix Corporation, Kirkland, WA (US)

( * ) Notice: Subject to any disclaimer, the term of this patent is extended or adjusted under 35 U.S.C. 154(b) by 65 days.

(21) Appl. No.: 14/049,016

(22) Filed: Oct. 8, 2013

(65) Prior Publication Data

US 2014/0040591 A1 Feb. 6, 2014

Related U.S. Application Data

(63) Continuation of application No. 13/461,740, filed on May 1, 2012, now Pat. No. 8,650,538.

(51) Int. Cl.
*G02B 7/00* (2006.01)
*G06F 13/00* (2006.01)
*G06F 9/44* (2006.01)
*G06F 12/02* (2006.01)
*G06F 12/06* (2006.01)
*G06F 9/06* (2006.01)
*G06F 13/28* (2006.01)

(52) U.S. Cl.
CPC ........ *G06F 12/0253* (2013.01); *G06F 12/0269* (2013.01); *G06F 12/06* (2013.01); *G06F 8/311* (2013.01); *G06F 13/00* (2013.01); *G06F 8/30* (2013.01); *G06F 9/06* (2013.01); *G06F 9/44* (2013.01); *G06F 13/28* (2013.01)

USPC ........... 359/896; 711/100; 711/171; 711/172; 717/114; 717/127; 717/158

(58) Field of Classification Search
CPC ............... G02B 7/00; G06F 8/30; G06F 8/31; G06F 8/311; G06F 8/443; G06F 9/00; G06F 9/06; G06F 9/44; G06F 11/3632; G06F 12/00; G06F 12/0253; G06F 12/0261; G06F 12/0269; G06F 12/0276; G06F 12/06; G06F 13/00
USPC .................. 359/896, 900; 711/100, 170–172; 717/114, 120–122, 127, 128, 130, 131, 717/158
See application file for complete search history.

(56) References Cited

U.S. PATENT DOCUMENTS

| | | | |
|---|---|---|---|
| 5,539,899 A * | 7/1996 | Huynh et al. | 711/171 |
| 8,032,875 B2 * | 10/2011 | Kosche et al. | 717/158 |
| 8,117,600 B1 * | 2/2012 | Roeck et al. | 717/128 |
| 8,650,538 B2 * | 2/2014 | Gounares | 717/114 |
| 8,813,055 B2 * | 8/2014 | Kosche | 717/158 |

* cited by examiner

*Primary Examiner* — Loha Ben
(74) *Attorney, Agent, or Firm* — ÆON Law; Adam L.K. Philipp

(57) ABSTRACT

An execution environment for functional code may treat application segments as individual programs for memory management. A larger program of application may be segmented into functional blocks that receive an input and return a value, but operate without changing state of other memory objects. The program segments may have memory pages allocated to the segments by the operating system as other full programs, and may deallocate memory pages when the segments finish operating. Functional programming languages and imperative programming languages may define program segments explicitly or implicitly, and the program segments may be identified at compile time or runtime.

20 Claims, 4 Drawing Sheets

GARBAGE COLLECTION BASED ON FUNCTIONAL BLOCK SIZE

CROSS REFERENCE TO RELATED APPLICATIONS

This application claims the benefit of and priority to U.S. patent application Ser. No. 13/461,740 entitled "Meta Garbage Collection for Functional Code" filed 1 May 2012, the entire contents of which are hereby expressly incorporated by reference for all they disclose and teach.

BACKGROUND

Functional programming languages operate without having mutable state. Examples of functional programming languages include Haskell, Erlang, F#, and others. In some cases, imperative or other languages may be used to create programs that operate in a similar fashion, even though other languages may not enforce the same constraints as functional languages.

A concept within functional programs is that the code may operate by sending an argument to a function, which returns a result. While evaluating the argument, the function may not change the state of any other items.

SUMMARY

An execution environment for functional code may treat application segments as individual programs for memory management. A larger program of application may be segmented into functional blocks that receive an input and return a value, but operate without changing state of other memory objects. The program segments may have memory pages allocated to the segments by the operating system as other full programs, and may deallocate memory pages when the segments finish operating. Functional programming languages and imperative programming languages may define program segments explicitly or implicitly, and the program segments may be identified at compile time or runtime.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
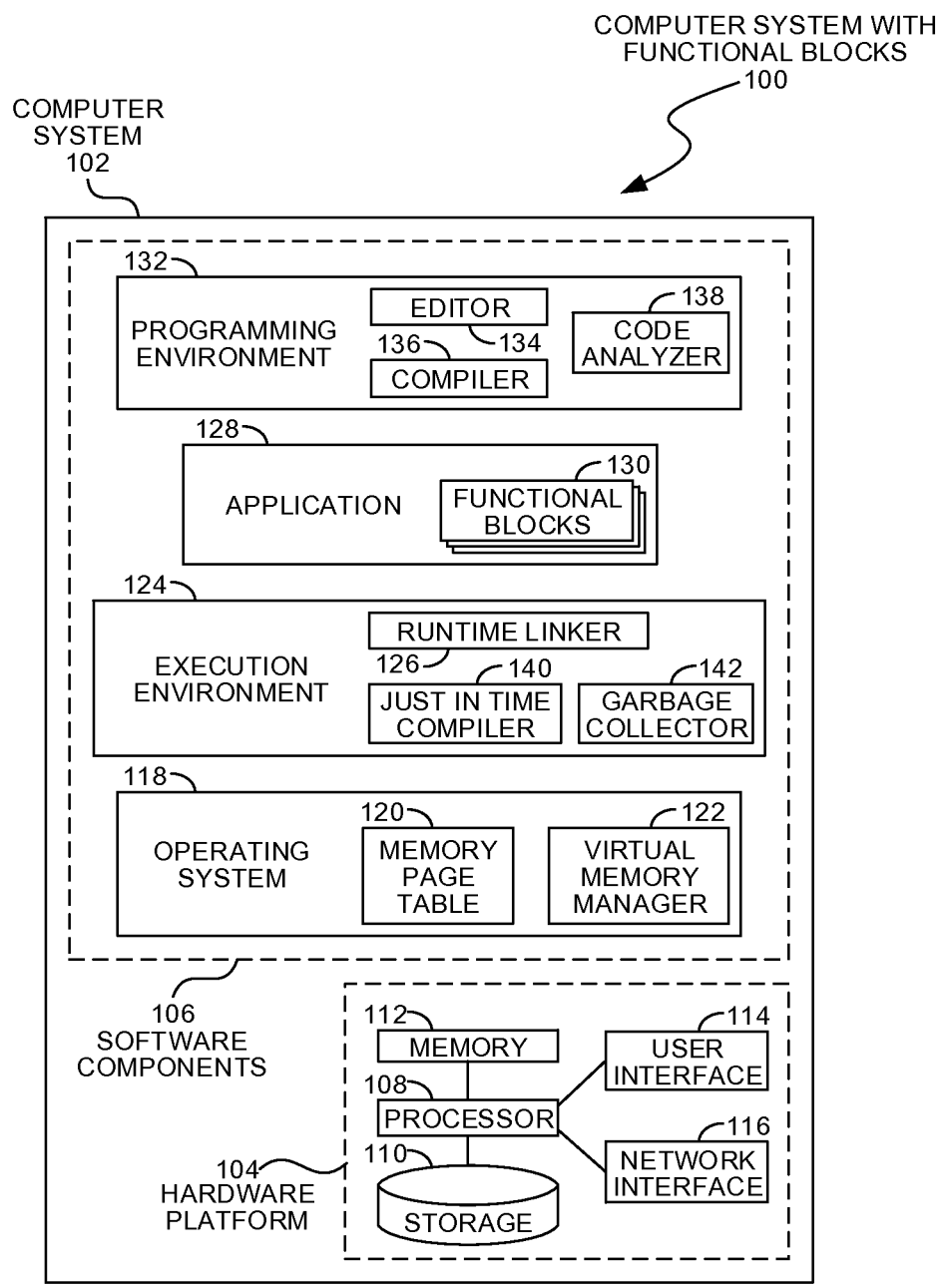
FIG. 1 is a diagram illustration of an embodiment showing a system with an execution environment which may launch functional blocks as separate programs.

An execution environment for functional code may treat program segments as separate programs for memory allocation and memory management from an operating system. Each program segment may be allocated one or more pages of memory, and when the program segment has completed executing, the program segment may be flushed from the operating system, thereby freeing up the memory allocated to the program segment.

Functional languages and programs written in a functional language style may operate with functional blocks that receive an input, process the input, and produce a result. Because programs that operate in a functional language style operate without mutable state, functional blocks may not change the state of any other memory object during processing. Hence, the functional blocks may be executed independently of other portions of an application. During execution, a functional block may create temporary memory objects that may consume memory, and when the functional block exits, those temporary memory objects are no longer used and therefore can be discarded.

The execution environment may treat each functional block as a separate, independent program from the operating system's point of view, which can result in efficient memory management and garbage collection. Each functional block may be executed in the operating system so that the operating system may allocate pages of memory to the functional block, then reallocate the memory after the functional block has completed.

A characteristic of functional languages and programs written in functional language style is that only the input and result will persist after a functional block has executed, and that no other object in memory will be affected by the execution. Therefore any other memory object created by the functional block will be discarded after execution. Based on this characteristic, an execution environment may treat functional blocks as individual programs that receive an input and return a result.

Many operating systems treat programs by allocating memory to the program during execution, then repurposed after the program has finished. Operating systems typically have mechanisms to allocate memory in pages, and a program that fills its current memory allotment may be allocated additional pages. When a program is terminated within the operating system, the memory may be allocated to other programs.

By treating functional blocks as separate, independent programs from the operating system's standpoint, garbage collection for functional blocks may occur when the functional block terminates and the operating system reallocates the assigned memory. An execution environment may therefore not incorporate a separate garbage collection mechanism for the functional blocks and may use the operating system's inherent capabilities of allocating and deallocating memory as a garbage collection mechanism.

Some functional languages may create large numbers of functional blocks, which may lead to inefficient memory usage if all of the functional blocks were treated as separate, independent programs. Inefficient memory usage may occur, for example, when a functional block uses only a small fraction of a memory page, yet the memory page may be the smallest portion that an operating system may be capable of allocating. In such cases, larger functional blocks may be created by combining several functional blocks or individual functional elements into larger functional blocks. The larger functional blocks may lead to smaller numbers of independent programs and more efficient memory usage.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system that may operate functional blocks of a larger program as separate programs from the operating system's standpoint. Embodiment 100 is a simplified example of the various software and hardware components that may be used an execution environment for applications with functional blocks.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a computer system 102 that may treat portions of an application as independent programs. As the applications are created, independent functional blocks may be identified, and those functional blocks may be executed within an operating system as independent programs.

By treating functional blocks of an application as independent programs, the garbage collection operations that often accompany declarative or other languages may be avoided for those functional blocks. In embodiments where an entire application is written in a functional language or with functional language characteristics, garbage collection may be avoided.

Garbage collection is a form of automatic memory management. Objects that are created in memory but are no longer used by an application or program may be reclaimed or collected and reused. Applications that create large numbers of memory objects often use garbage collection to manage memory.

When an application is written using functional language techniques, whether or not the application is written in a functional language, the application may be broken into smaller segments. Within each segment, the segment may operate by operating on a set of input parameters and returning a set of result parameters, but without accessing or returning any other state. In this manner, the program segment may operate using functional language characteristics.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The operating system 118 may include a memory page table 120 and a virtual memory manager 122. A memory page table 120 may keep track of which pages of memory are allocated to different programs, while the virtual memory manager 122 may create a large pool of memory that may be swapped in and out of physical memory.

The memory page table 120 may be a table that includes information for each page or portion of memory. The operating system 118 may allocate memory to various programs as those programs are executed, and each allocation may be placed in the memory page table 120. In many embodiments, the memory page table 120 may include information on each page of memory, which program has access to the page, and a state of the page. The page state may be in use, unallocated, or some other state.

The virtual memory manager 122 may be a memory management mechanism that may allocate more memory than may be physically present. Pages that may be allocated to a program but may not be in use may be copied to a hard disk or other storage. When that page may be accessed, a page fault may be created and the virtual memory manager 122 may retrieve the page from disk and place it in memory.

The memory page table 120 may operate in conjunction with a virtual memory manager 122 to manage memory for various applications that may execute on the computer system 102.

An execution environment 124 may execute an application 128. In some embodiments, an execution environment 124 may be referred to as a 'virtual machine' or other abstraction layer that may manage execution of the application 128. In some embodiments, the execution environment 124 may have a just-in-time compiler 140, a runtime linker 126, or other components that may prepare an application for execution.

A just-in-time compiler 140 may compile an application at runtime. In some such embodiments, a programming environment 132 may have a compiler 136 that generates intermediate code which may be further complied by a just-in-time complier 140 into machine language. Some such embodiments may create intermediate code that is machine-independent, and the just-in-time compiler 140 may create machine-specific code.

A runtime linker 126 may link different sections of compiled code together into the application being executed. A runtime linker 126 may perform some of the code linking at runtime, as opposed to a linker that may operate at compile time.

An application 128 may be created with several functional blocks 130. The functional blocks 130 may be pieces of the application 128 that may operate in a functional manner, meaning that the functional blocks may operate only on a set of input parameters without changing state of any other memory objects. In applications where the entire program may be written in a functional language, all of the program may consist of functional blocks 130. In other embodiments, only portions of an application may be considered a functional block.

A programming environment 132 may be an application or group of applications that a programmer may use to create, test, and deploy an application. The programming environment 132 may include an editor 134, compiler 136, and code analyzer 138. The editor 134 may be used to create, edit, and modify program source code, which may be compiled using the compiler 136.

The functional blocks 130 may be identified by the compiler 136. In some embodiments, a code analyzer 138 may identify the functional blocks 130. The code analyzer 138 may identify functional blocks 130 by analyzing source code. In such an embodiment, the code analyzer 138 may be executed prior to the compiler 136. In other embodiments, the code analyzer 138 may analyze compiled code, in which case the code analyzer 138 may execute after the compiler 136.

In some situations, a functional block may be too large for executing as independent programs. In such cases, an execution environment 124 may manage execution of that portion of an application and may have a garbage collector 142 that may manage the memory elements consumed by the application.

Figure 2:
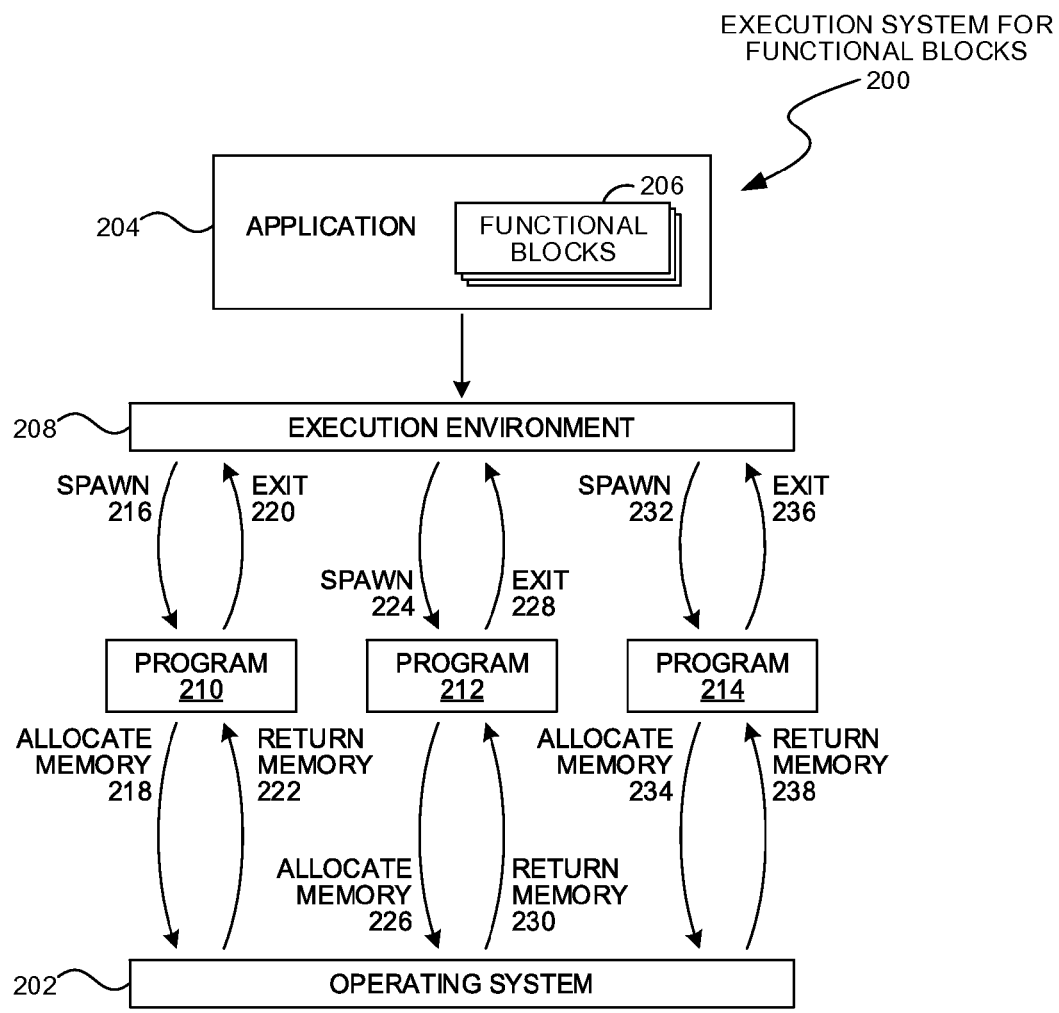
FIG. 2 is a diagram illustration of an embodiment showing an execution system for functional blocks.

FIG. 2 is a diagram illustration showing an example embodiment 200 of an execution system for functional blocks. Embodiment 200 is a simplified example of how an operating system may allocate memory, then return memory once a functional block has completed operation.

Embodiment 200 illustrates how an operating system's inherent capabilities of memory management may be used with functional blocks to perform garbage collection. Such an embodiment may limit or eliminate garbage collection for languages that can be defined in functional blocks.

Embodiment 200 illustrates an operating system 202 that may execute an application 204 that has several functional blocks 206. An execution environment 208 may deploy each functional block as a separate program 210, 212, and 214.

A first functional block may be deployed as program 210. The execution environment 208 may spawn the program 210. In response, the operating system 202 may allocate memory 218 to the program 210. As the program 210 requests more memory, additional memory may be allocated to the program 210. When the program 210 finishes execution, the program 210 may exit 220 and pass messages or other information to the execution environment 208. As the program exits, the memory allocated to the program 210 may be returned 222 to the operating system 202.

Similarly, a second functional block may be deployed as program 212. It may be spawned 224 and allocated memory 226. When the program 212 exits 228, the memory may be returned 232 to the operating system 202

A third functional block may be deployed as program 214. Program 214 may be spawned 232 and have memory allocated 234. At exit 236, the memory may be returned 238.

In the example of embodiment 200, the execution environment 208 may spawn various functional blocks as separate programs. The execution environment 208 may send and receive messages to each of the executing programs 210, 212, and 214, and may facilitate communication from one executing program to another.

In many embodiments, an operating system may allocate memory in defined portions. Some operating systems call these portions 'pages'.

Figure 3:
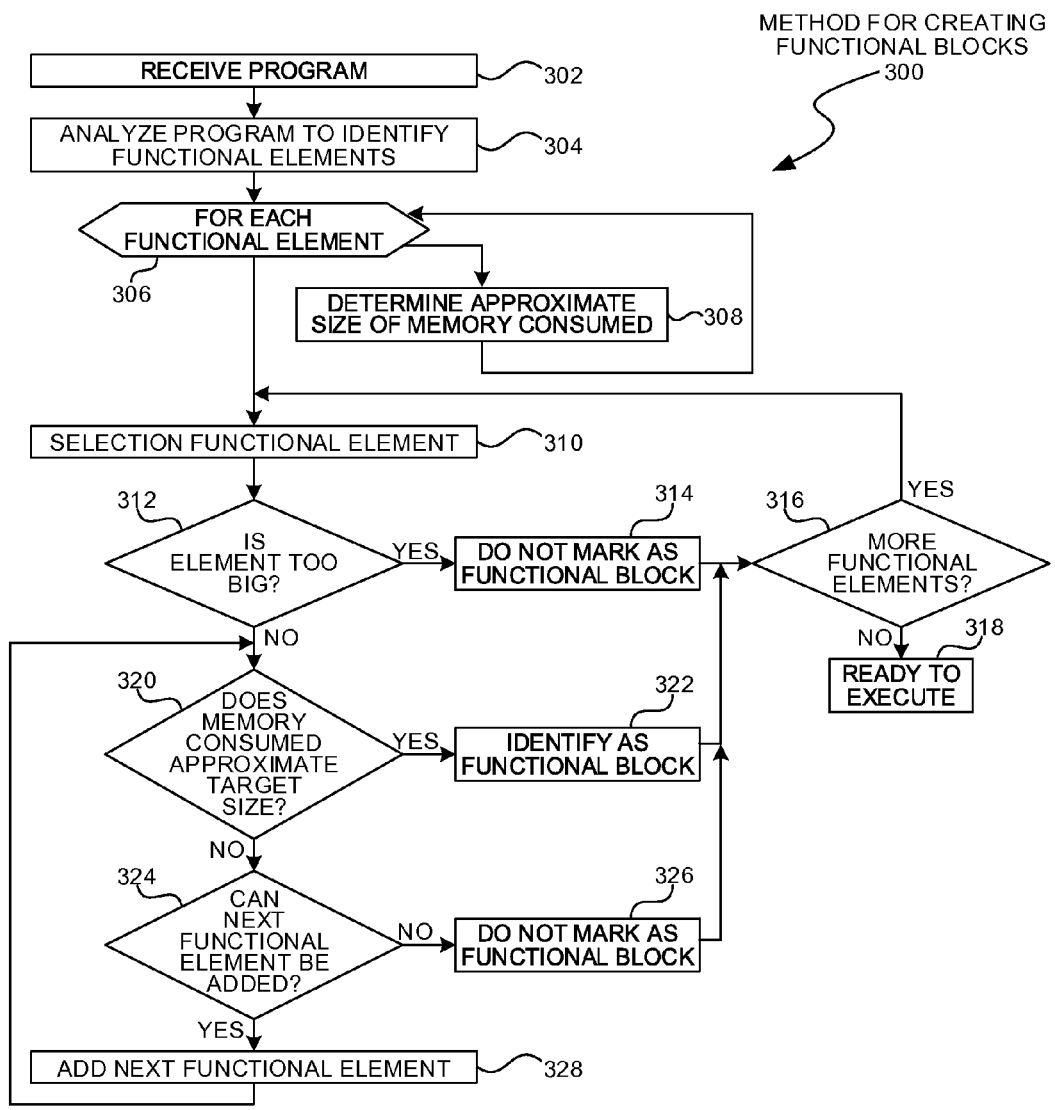
FIG. 3 is a flowchart illustration of an embodiment showing a method for creating functional blocks.

FIG. 3 is a flowchart illustration of an embodiment 300 showing a method for creating functional blocks. Embodiment 300 is a simplified example of a sequence for creating a functional block that is properly sized for a particular operating system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a mechanism for creating functional blocks that have an appropriate size for operating as independent programs. Functional blocks that are too small may use only small amounts of memory but may be allocated an entire page of memory. Such functional blocks may be very inefficient.

On the other end of the spectrum, functional blocks that are very large may not efficiently use the operating system's memory allocator to manage memory items. In such cases, large functional blocks may be executed in an environment that has a garbage collection system or other memory managers.

The operations of embodiment 300 may be performed by a compiler, code analysis engine, or some other automated system prior to executing an application. Embodiment 300 may use a static analysis to identify functional blocks, where the static analysis may be performed prior to executing.

A program to be executed may be received in block 302. In some embodiments, the program may be in a functional language and the analysis may be performed using source code. In other embodiments, the program may be received in an intermediate language after compilation and before further compilation that may occur at runtime. In still other embodiments, the program may be received as machine code for analysis.

In block 304, the program may be analyzed to identify functional elements. In programming languages or paradigms where message passing may communicate output from one function to the input of another function, the message passing events may be used to separately identify each function element. Some functional programming languages may use a notion of functions, and each function may be considered a functional element.

For each functional element in block 306, an approximate size of the memory consumed by the functional element may be determined in block 308. In some cases, the memory consumed by a functional element may not be accurately determined. For example, a function that may receive a specific, defined type and perform an action on the data type may be accurately estimated. In another example, a function that may receive and process a list of items may not be estimated accurately, because the list may be unbounded.

After determining the approximate memory usage of each functional element, a beginning element may be selected in block 310.

The element may be analyzed in block 312 to determine if the element is too big for a functional block. In many embodiments, a range of memory sizes may be established for functional blocks. The range may define the smallest and largest acceptable sizes for functional blocks.

While each embodiment may have different ranges of memory sizes, memory ranges from one, two, three, four, five, or even ten pages of memory may be considered on the lower end. Memory ranges of two, three, five, ten, twenty, fifty, or more memory pages may be considered the lower end.

If the element is too big in block 312, the element may not be marked as a functional block in block 314. Such an element may be a candidate for operation within an execution environment that has a garbage collection mechanism.

After marking the functional element in block 314, if more functional elements are unanalyzed, the process may return to block 310. If no more functional elements are unanalyzed, the process may end in block 316 with the application ready for execution.

If the element is not too big in block 312, the method may try to create a functional block that is within the target size by combining functional elements together to create a large enough block.

In block 320, if the functional element consumes the approximate target memory size, the functional element may be marked as a functional block in block 322.

In many embodiments the operations of block 322 may also package the function to operate as a separate program. The packaging may include external message transport that allow the function to communicate with an execution environment, as well as information and metadata that may be communicated to an operating system so that the functional block may operate as a standalone program.

If the functional element does not consume the desired amount of memory in block 320, a determination may be made in block 322 as to whether or not a next functional element may be added to the current functional element. Such a determination may be made when two elements are linked together in some fashion.

Determining whether or not two functional elements may be added together may involve analyzing the linkages or connections between the elements. In the case where the output of one function may be the input of a second function, there may be a determination that the functions can be combined in a functional block. In the case where the output of one function may go to many other functions or to one of many other functions, the determination may be made that the functions cannot be combined.

When the functions cannot be combined, the functions may not be marked as a functional block. Even though the initial functional element may be smaller than the upper range of memory sizes, the functional element may be considered too small and may have a high likelihood of using memory inefficiently.

When the next functional element may be added to the current functional element, the two elements may be added together in block 328 and the set of functional elements may be examined in block 320. The process may cycle several times, adding functional elements together into a larger functional block that contains a set of functional elements.

Figure 4:
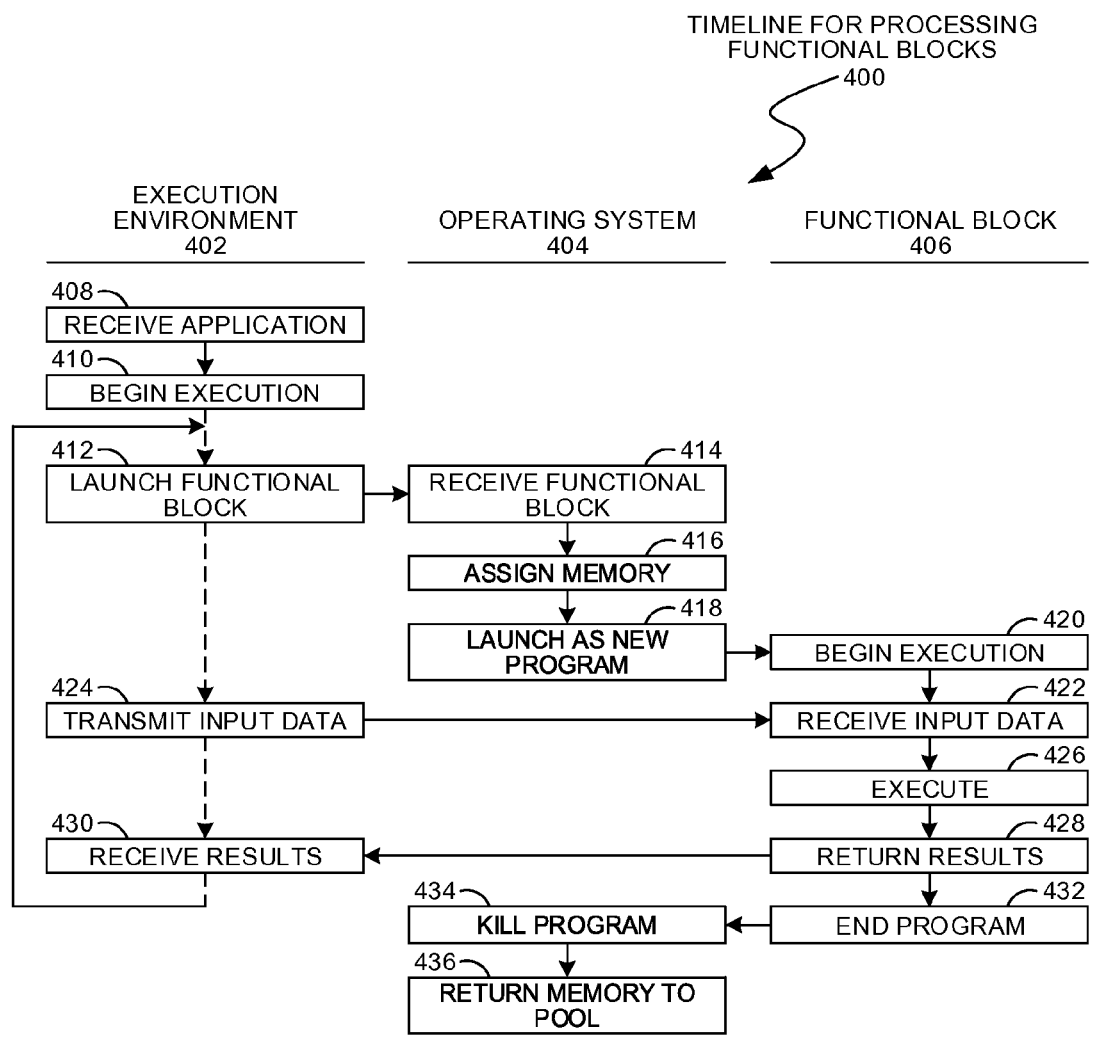
FIG. 4 is a flowchart illustration of an embodiment showing a method for executing an application with functional blocks.

FIG. 4 is a flowchart illustration of an embodiment 400 showing a method for executing an application using functional blocks. Embodiment 400 illustrates the operations of an execution environment 402 on the left hand column, an operating system 404 in the center column, and the operations of a functional block 406 in the right hand column Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 shows the simplified interactions between various components that may execute an application. Some of the application may be executed within an execution environment 402, while other parts of the application may be executed as functional blocks that operate as separate, standalone applications. As separate applications, the functional blocks may operate without garbage collection.

In block 408, a program may be received for execution, which may begin in block 410.

As part of the execution, a functional block may be launched in block 412.

The operating system 404 may receive the functional block in block 414 and assign memory pages to the functional block in block 416. The functional block may launch as a new program in block 418.

The functional block 406 may begin execution in block 420. The execution environment 402 may transmit input parameters and data in block 422, which may be received in block 424. The functional block 406 may execute in block 426 to produce results. The results may be transmitted in block 428 and received by the execution environment 402 in block 430.

After completing execution, the functional block may end in block 432. The operating system 404 may kill the functional block program in block 434 and return allocated memory in block 436 for use by other applications.

The execution environment 402 may receive results in block 430 and continue execution back to block 412.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving an application to execute;
   identifying a plurality of program segments within said application, said program segments receiving an input and returning an output;
   determining that a first program segment will consume greater than a predetermined amount of memory and launching said first program segment such that a virtual machine garbage collection mechanism manages memory for said first program segment;
   determining that a second program segment will consume less than said predetermined amount of memory and launching said second program segment within an operating system, said operating system having a memory page table having a page identifier, a process identifier, and a page state for each of a plurality of memory pages;
   requesting a first memory page from the operating system, said first memory page being allocated to said second program segment;
   executing said second program segment using said first memory page and passing said input to said second program segment and receiving said output from said second program segment;
   determining that said second program segment has completed execution and ending said second program segment in said operating system such that said operating system releases said first memory page.

2. The method of claim 1, said plurality of segments being identified when said application is compiled by a compiler from a source code.

3. The method of claim 2, said source code comprising source code identifiers identifying a beginning and an end to said second program segment.

4. The method of claim 3, said source code identifiers comprising commands in said source code.

5. The method of claim 2, said source code being analyzed by said compiler to identify a beginning and an end to said program segment.

6. The method of claim 2, said source code being written in a functional language.

7. The method of claim 2, said source code being written in an imperative language.

8. The method of claim 1 further comprising:
   requesting a second memory page from said operating system and allocating said second memory page to said second program segment.

9. The method of claim 1, said plurality of segments being identified when said application is linked after compiling.

10. The method of claim 1, said plurality of segments being identified at runtime.

11. The method of claim 1, said operating system having a range of logical memory addresses larger than a range of physical memory addresses.

12. The method of claim 1, said second program segment being executed within said operating system as a separate program from said first program segment.

13. A system comprising:
   at least one processor;
   a functional block analyzer that identifies functional blocks of an application program;
   an operating system having a memory page table having a page identifier, a process identifier, and a page state for each of a plurality of memory pages, said operating system that further allocates pages to executing code;
   an operating environment executing on said at least one processor, said operating environment that:
      receives an application to execute;
      determines that a first functional block will consume greater than a predetermined amount of memory and launches said first functional block such that a virtual machine garbage collection mechanism manages memory for said first functional block;
      determines that a second functional block will consume less than said predetermined amount of memory and launches said second functional block within said operating system, causing a first memory page to be allocated to said second functional block, and releasing said first memory page to be released after determining that said second functional block has completed execution.

14. The system of claim 13, said operating environment that executes said first program segment as a separate program within said operating system from said first functional block.

15. The system of claim 13, said operating environment that links said first program segment to said first functional block at runtime.

16. The system of claim 13, said operating environment that further:
   identifies a third functional block as part of said application;
   launches said third functional block within said operating system, said operating system allocating a second memory page to said third functional block;
   executes said third functional block using said second memory page;
   determines that said third functional block has completed execution and ending said third functional block in said operating system such that said operating system releases said second memory page.

17. The system of claim 16, said third functional block being called from said second functional block.

18. The system of claim 13, said functional block analyzer identifying said functional blocks at compile time.

19. The system of claim 13, said functional block analyzer identifying said functional blocks at runtime.

20. The system of claim 13, said operating system having no virtual mapping of memory.

\* \* \* \* \*